United States Patent
Subramanian

(10) Patent No.: US 8,034,469 B1
(45) Date of Patent: Oct. 11, 2011

(54) TWO-LEVEL LAYER SYSTEM WITH PYROCHLORE PHASE AND OXIDES

(75) Inventor: Ramesh Subramanian, Oviedo, FL (US)

(73) Assignee: Siemens Aktiengesellschaft, Munich (DE)

( * ) Notice: Subject to any disclaimer, the term of this patent is extended or adjusted under 35 U.S.C. 154(b) by 721 days.

(21) Appl. No.: 12/151,422

(22) Filed: May 6, 2008

Related U.S. Application Data

(60) Provisional application No. 60/928,088, filed on May 7, 2007.

(30) Foreign Application Priority Data

May 7, 2007 (EP) .................... 07009128

(51) Int. Cl.
- B32B 18/00 (2006.01)
- B32B 7/00 (2006.01)
- C04B 35/48 (2006.01)
- C22C 19/05 (2006.01)

(52) U.S. Cl. ........ 428/701; 428/213; 428/215; 501/132; 501/134; 501/152; 420/437; 420/443

(58) Field of Classification Search .......... 428/212–213, 428/216, 688–689, 697–699, 701–702; 501/132, 501/134, 152; 420/435–437, 580–586, 588, 420/441–443, 445; 416/241 B See application file for complete search history.

(56) References Cited

U.S. PATENT DOCUMENTS

| | | | | |
|---|---|---|---|---|
| 4,419,416 A | * | 12/1983 | Gupta et al. | 428/656 |
| 4,610,967 A | * | 9/1986 | Imanishi et al. | 501/103 |
| 6,024,792 A | | 2/2000 | Kurz et al. | |
| 6,177,200 B1 | * | 1/2001 | Maloney | 428/472 |
| 6,756,131 B2 | * | 6/2004 | Oguma et al. | 428/632 |
| 2006/0286401 A1 | | 12/2006 | Kaiser et al. | |
| 2007/0065675 A1 | * | 3/2007 | Stamm | 428/679 |

FOREIGN PATENT DOCUMENTS

| | | |
|---|---|---|
| DE | 202005020695 U1 | 7/2006 |
| DE | 202006009526 U1 | 9/2006 |
| DE | 202006009527 U1 | 9/2006 |
| DE | 20 2006 009 603 U1 | 12/2006 |
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 0992603 A1 | 4/2000 |
| EP | 0944746 B1 | 7/2001 |
| EP | 1306454 A1 | 5/2003 |

(Continued)

OTHER PUBLICATIONS

Karaulov et al. "Phase Formation in the ZrO2-HfO2-Gd2O3 and ZrO2-HfO2-YB2O3". Refractories and Industrial Ceramics, vol. 40, Nos. 11-12, (1999). pp. 479-483.*

*Primary Examiner* — David Sample
*Assistant Examiner* — Prashant J Khatri

(57) ABSTRACT

There is described a two-Level Layer System with Pyrochlore Phase and Oxides. Besides a good thermal insulation property, thermal insulation layer systems must also have a long lifetime of the thermal insulation layer. The layer system has a layer sequence of a metallic bonding layer, an inner ceramic layer and an outer ceramic layer, which are specially matched to one another.

18 Claims, 4 Drawing Sheets

FOREIGN PATENT DOCUMENTS

| | | |
|---|---|---|
| EP | 1319729 A1 | 6/2003 |
| EP | 1321542 A1 | 6/2003 |
| EP | 1204776 B1 | 6/2004 |
| EP | 1783248 A1 | 5/2007 |
| EP | 1790754 A1 | 5/2007 |
| EP | 1806432 A1 | 7/2007 |
| EP | 1806435 A2 | 7/2007 |
| WO | WO 9967435 A1 | 12/1999 |
| WO | WO 0044949 A1 | 8/2000 |
| WO | WO 2005019370 A2 | 3/2005 |
| WO | WO 2005/042802 A1 * | 5/2005 |

* cited by examiner

FIG 2

| Material | C | Cr | Ni | Co | Mo | W | Ta | Nb | Al | Ti | B | Zr | Hf |
|---|---|---|---|---|---|---|---|---|---|---|---|---|---|
| Ni-based precision casting alloys | | | | | | | | | | | | | |
| GTD 222 | 0.10 | 22.5 | Remainder | 19.0 | | 2.0 | 1.0 | | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | 2.9 | 2.9 | 0.006 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <0.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | 0.03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | 1.00 |
| IN 792 DS | 0.08 | 12.5 | Remainder | 9.0 | 1.9 | 4.1 | 4.1 | | 3.4 | 3.8 | 0.015 | 0.02 | 1.00 |
| MAR M 002 | 0.15 | 9.0 | Remainder | 10.0 | | 10.0 | 2.5 | | 5.5 | 1.5 | 0.015 | 0.05 | 1.50 |
| MAR M 247 LC DS | 0.07 | 8.1 | Remainder | 9.2 | 0.5 | 9.5 | 3.2 | | 5.6 | 0.7 | 0.015 | 0.02 | 1.40 |
| CMSX-2 | <.006 | 8.0 | Remainder | 4.6 | 0.6 | 8.0 | 6.0 | | 5.6 | 1.0 | <.003 | <.0075 | 0.10 |
| CMSX-3 | <.006 | 8.0 | Remainder | 4.6 | 0.6 | 8.0 | 6.0 | | 5.6 | 1.0 | <.003 | <.0075 | 0.10 |
| CMSX-4 | | 6.0 | Remainder | 10.0 | 0.6 | 6.0 | 6.0 | | 5.6 | 1.0 | | Re=3.0 | 0.10 |
| CMSX-6 | <.015 | 10.0 | Remainder | 5.0 | 3.0 | <.10 | 2.0 | <.10 | 4.9 | 4.8 | <.003 | <.0075 | 0.10 |
| PWA 1480 SX | <.006 | 10.0 | Remainder | 5.0 | | 4.0 | 12.0 | | 5.0 | 1.5 | <.0075 | <.0075 | |
| PWA 1483 SX | 0.07 | 12.2 | Remainder | 9.0 | 1.9 | 3.8 | 5.0 | | 3.6 | 4.2 | 0.0001 | 0.002 | |
| Co-based precision casting alloys | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Remainder | | 7.5 | 4 | | | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

Chemical composition in %

TWO-LEVEL LAYER SYSTEM WITH PYROCHLORE PHASE AND OXIDES

CROSS REFERENCE TO RELATED APPLICATIONS

The present application claims the benefit of the provisional patent application filed on May 7, 2007, and assigned application No. 60/928,088, and of European Patent Office application No. 07009128 EP filed May 7, 2007, all of the applications are incorporated by reference herein in their entirety.

FIELD OF INVENTION

The invention relates to a layer system with pyrochlores.

BACKGROUND OF INVENTION

Such a layer system has a substrate comprising a metal alloy based on nickel or cobalt. Such products are used especially as a component of a gas turbine, in particular as gas turbine blades or heat shields. The components are exposed to a hot gas flow of aggressive combustion gases. They must therefore be able to withstand heavy thermal loads. It is furthermore necessary for these components to be oxidation- and corrosion-resistant. Especially moving components, for example gas turbine blades, but also static components, are furthermore subject to mechanical requirements. The power and efficiency of a gas turbine, in which there are components exposable to hot gas, increase with a rising operating temperature. In order to achieve a high efficiency and a high power, those gas turbine components which are particularly exposed to high temperatures are coated with a ceramic material. This acts as a thermal insulation layer between the hot gas flow and the metallic substrate.

The metallic base body is protected against the aggressive hot gas flow by coatings. In this context, modern components usually comprise a plurality of coatings which respectively fulfill specific functions. The system is therefore a multilayer system. Since the power and efficiency of gas turbines increase with a rising operating temperature, attempts are continually being made to achieve a higher performance of gas turbines by improving the coating system.

EP 0 944 746 B1 discloses the use of pyrochlores as a thermal insulation layer. The use of a material as a thermal insulation layer, however, requires not only good thermal insulation properties but also good bonding to the substrate.

EP 0 992 603 A1 discloses a thermal insulation layer system of gadolinium oxide and zirconium oxide, which is not intended to have a pyrochlore structure.

SUMMARY OF INVENTION

It is therefore an object of the invention to provide a layer system which has good thermal insulation properties and good bonding to the substrate, and therefore a long lifetime of the entire layer system.

The invention is based on the discovery that in order to achieve a long lifetime, the entire system must be considered as a whole and individual layers or some layers together should not be considered and optimized separately from one another.

The object is achieved by a layer system as claimed in an independent claim.

BRIEF DESCRIPTION OF THE DRAWINGS

The dependent claims describe further advantageous measures, which may advantageously be combined in any desired way.

FIG. 2 shows a page of superalloys.

DETAILED DESCRIPTION OF INVENTION

Figure 1:
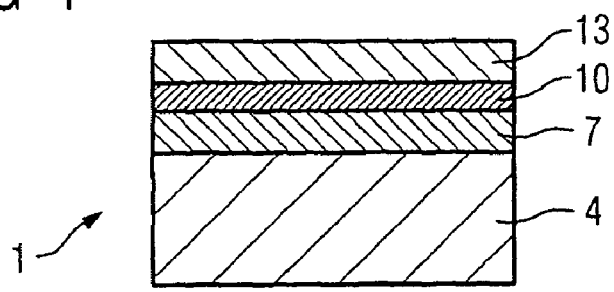
FIG. 1 shows a layer system according to the invention.

FIG. 1 shows a layer system 1 according to the invention.

The layer system 1 comprises a metallic substrate 4 which, in particular for components at high temperatures, consists of a nickel- or cobalt-based superalloy (FIG. 2).

There is preferably a metallic bonding layer 7 directly on the substrate 4, in particular of the NiCoCrAlX type, which preferably comprises (11-13) wt % cobalt, (20-22) wt % chromium (10.5-11.5) wt % aluminum, (0.3-0.5) wt % yttrium, (1.5-2.5) wt % rhenium and the remainder nickel, or preferably (24-26) wt % cobalt, (16-18) wt % chromium (9.5-11) wt % aluminum, (0.3-0.5) wt % yttrium, (1-1.8) wt % rhenium and the remainder nickel. The bonding layer 7 consists in particular of one of these two alloys.

An aluminum oxide layer is preferably formed already on this metallic bonding layer 7 before further ceramic layers are applied, or such an aluminum oxide layer (TGO) is formed during operation.

There is an inner ceramic layer 10, preferably a fully or partially stabilized zirconium oxide layer, on the metallic bonding layer 7 or on the aluminum oxide layer (not shown) or on the substrate 4.

Yttrium-stabilized zirconium oxide is preferably used, with from 6 wt % to 8 wt % of yttrium preferably being employed. Calcium oxide, cerium oxide and/or hafnium oxide may likewise be used to stabilize zirconium oxide. The zirconium oxide is preferably applied as a plasma-sprayed layer, although it may also preferably be applied as a columnar structure by means of electron beam deposition (EB-PVD).

An outer ceramic layer 13, in particular the outermost layer (exposed directly to a hot gas) which consists mainly of a pyrochlore phase, i.e. comprises at least 92 wt % of a pyrochlore phase that preferably comprises either gadolinium hafnate, in particular $Gd_2Hf_2O_7$, or gadolinium zirconate, in particular $Gd_2Zr_2O_7$, and in particular consists thereof, is applied on the stabilized zirconium oxide layer 10.

Preferably 100 wt % of the outer layer 13 consists of one of the two pyrochlore phases. Amorphous phases, pure $GdO_2$, pure $ZrO_2$ or pure $HfO_2$, mixed phases of $GdO_2$ and $ZrO_2$ or $HfO_2$, which do not comprise the pyrochlore phase, are in this case undesirable and should be minimized.

Preferably, however, the outermost ceramic layer 13 comprises up to 8 wt % of a secondary oxide, in particular from 0.5 wt % to 8 wt %, more particularly from 1 wt % to 8 wt %. The secondary oxide is in this case deliberately added to the powder for the ceramic layer 13 or to the ceramic layer 13, and is thus significantly above the metrological detection limit of the secondary oxide, i.e. it has at least two times the value of the detection limit of the secondary oxide.

The secondary oxide is preferably distributed in the layer 13, in particular homogeneously distributed. The secondary oxide is preferably present as an oxide (secondary phase).

Especially in the case of gadolinium zirconate as a pyrochlore phase, the ceramic layer 13 preferably comprises a secondary oxide with a proportion of from 1.5 wt % to 2.5 wt %, more particularly 2 wt %, in particular of hafnium oxide. The hafnium oxide may preferably be present as a pure oxide or as a mixed crystal forming partner in the pyrochlore phase. The secondary oxide may likewise fully form a mixed crystal with the pyrochlore phase.

Especially in the case of gadolinium hafnate, the ceramic layer 13 preferably comprises a secondary oxide with a proportion of from 5 wt % to 7 wt %, in particular with a proportion of 6 wt %, in particular zirconium oxide. The zirconium oxide may preferably be present as a pure oxide, or it may fully or partially form a mixed crystal.

The ceramic layer 13 may optionally comprise up to 0.05 wt % of silicon oxide, up to 0.1 wt % of calcium oxide, up to 0.1 wt % of magnesium oxide, up to 0.1 wt % of iron oxide, up to 0.1 wt % of aluminum oxide and up to 0.08 wt % of titanium oxide as sintering aids. The sintering aids promote coherence of the layer during application and during subsequent use at high temperatures. The ceramic layer 13 preferably does not comprise other sintering aids.

In particular, the layer system for the ceramic layer 13 comprises only one pyrochlore phase.

In order to achieve matching of the expansion coefficients of the outer ceramic layer to the underlying layers or to the substrate, there may also be only two pyrochlore phases present, which are then preferably formed from a mixture of gadolinium zirconate and gadolinium hafnate.

A mixed crystal, in particular $Gd_2(Hf_xZr_y)O_7$ with $x+y\approx2$, may likewise preferably be used as a single pyrochlore phase, since, owing to the mixing of different elements, there is no longer diffusion in this case and a high phase sensitivity is achieved. Departures from the stoichiometry $A_2B_2O_7$ may always occur, or may be adjusted deliberately.

It is likewise possible to use a powder mixture of two powders, each of which comprises a different pyrochlore phase. Here, in particular, gadolinium zirconate and gadolinium hafnate are used.

There is preferably only one second oxide in the ceramic layer 13. This is advantageous in particular when there is only one pyrochlore phase present.

Nevertheless, a plurality of or even only two secondary oxides may also be used in order to achieve matching of the expansion coefficients.

The layer system preferably consists of the substrate 4, the metallic bonding layer 7, optionally the TGO, the inner ceramic layer 10 and the outer ceramic layer 13. The outer ceramic layer 13 preferably consists of the pyrochlore phase/phases and secondary oxides without sintering aids.

The ceramic layer 13 preferably consists of pyrochlores, in particular gadolinium hafnate and/or gadolinium zirconate and/or secondary oxides, in particular hafnium oxide and/or zirconium oxide.

The outer ceramic layer 13 preferably consists of the pyrochlore phase/phases and secondary oxides without sintering aids.

The following combinations of secondary oxides and sintering aids are however preferred
    gadolinium zirconate+hafnium oxide
    gadolinium hafnate+zirconium oxide
    or their mixture (as a powder mixture or as a mixed crystal).

As the powder for the layer 13, gadolinium hafnate comprises from 43 wt % to 50 wt %, preferably from 44.7 wt % to 47.7 wt % of gadolinium oxide, the remainder being hafnium oxide and optionally the secondary oxides, preferably zirconium oxide, and optionally the sintering aids. Gadolinium zirconate as the powder comprises from 56 wt % to 63 wt %, preferably from 58 wt % to 61 wt % of gadolinium oxide, the remainder being zirconium oxide and optionally the secondary oxides, preferably hafnium oxide, and optionally sintering aids. These proportions are present in the mixed crystal or powder mixture according to the ratio of Hf and Zr.

For short-term use and/or higher temperatures, the outer layer 13 with the better thermal insulation properties will be configured to be thinner than the inner layer 10, which has inferior thermal insulation properties.

The layer thickness of the inner layer 10 is between 60% and 90% of the total layer thickness of the inner layer 10 plus the outer layer 13.

The layer thickness of the inner layer 10 is preferably between 60% and 80% of the total layer thickness. It is likewise advantageous for the layer thickness of the inner layer 10 to comprise from 60% to 70% of the total layer thickness. It is likewise preferable for the layer thickness of the inner layer 10 to be to be between 70% and <100% or between 70% and 90% of the total layer thickness. Advantageous results are likewise achieved if the contribution of the inner layer 10 to the total layer thickness is between 70% and 80%. It is likewise advantageous for the layer thickness of the inner layer 10 to comprise from 80% to 90% of the total layer thickness. It is likewise preferable for the layer thickness of the inner layer 10 to be to be between 90% and <100% of the total layer thickness.

The total layer thickness of the inner layer 10 plus the outer layer 13 is preferably 300 μm or preferably 450 μm. The maximum total layer thickness is advantageously 800 μm or preferably at most 600 μm.

Figure 3:
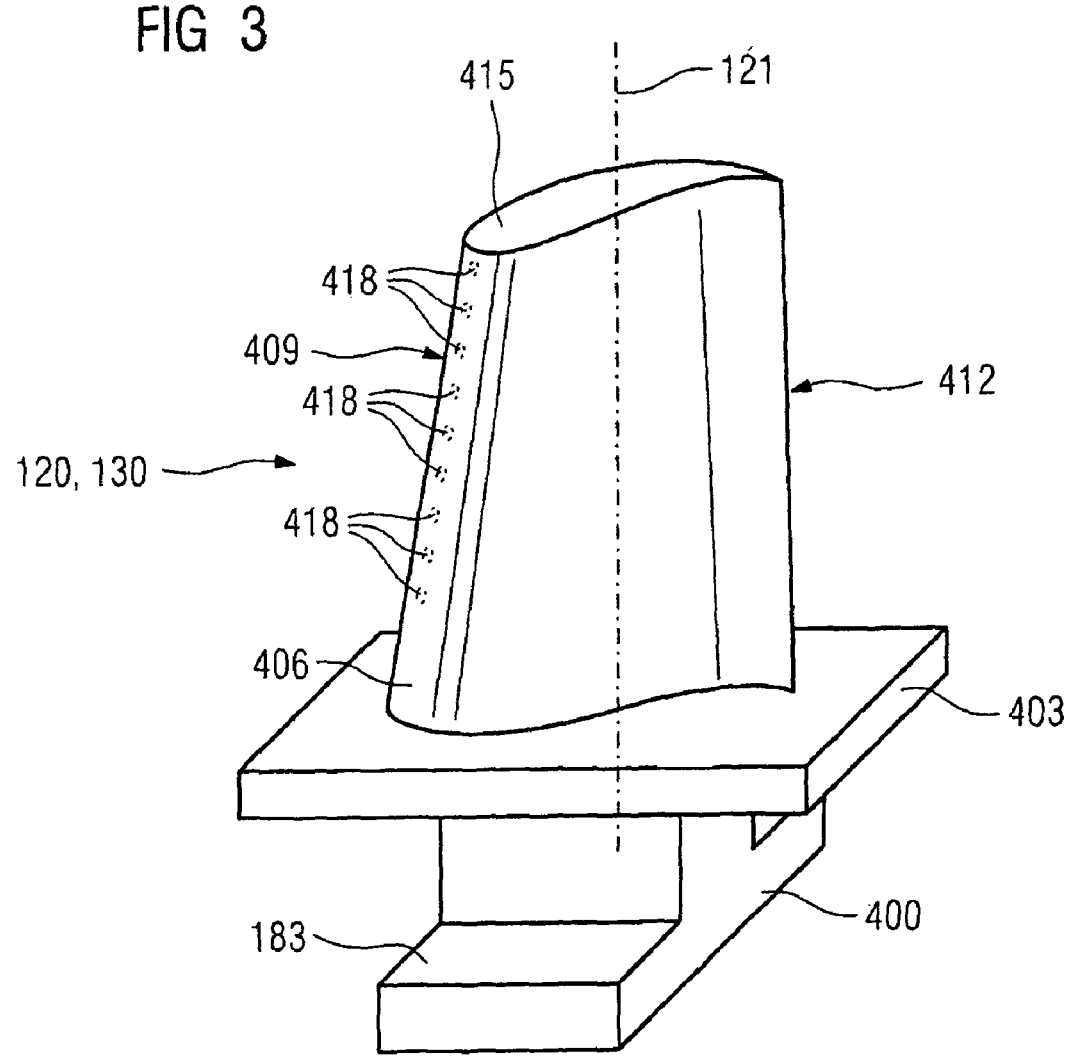
FIG. 3 shows a perspective view of a turbine blade.

FIG. 3 shows a perspective view of a rotor blade 120 or guide vane 130 of a turbomachine, which extends along the longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406. As a guide vane 130, the vane 130 may have a further platform (not shown) at its vane tip 415.

A blade root 183 which is used to fasten the rotor blades 120, 130 on a shaft or a disk (not shown) is formed in the fastening zone 400. The blade root 183 is configured, for example, as a hammerhead. Other configurations as a firtree or dovetail root are possible. The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130. Such superalloys are known for example from EP 1 204 776 B1, EP 1 306 454, EP 1 319 729 A1, WO 99/67435 or WO 00/44949; with respect to the chemical composition of the alloy, these documents are part of the disclosure. The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation. Such monocrystalline workpieces are manufactured, for example, by directional solidification from the melts. These are casting methods in which the liquid metal alloy is solidified to form a monocrystalline structure, i.e. to form the monocrystalline workpiece, or is directionally solidified. Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; these documents are part of the disclosure.

The blades 120, 130 may likewise have coatings against corrosion or oxidation, for example (MCrAlX; M is at least one element from the group ion (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX layer, there may furthermore be a ceramic thermal insulation layer 13 according to the invention. Rod-shaped grains are produced in the thermal insulation layer by suitable coating methods, for example electron beam deposition (EB-PVD).

Refurbishment means that components 120, 130 may need to have protective layers taken off (for example by sandblasting) after their use. The corrosion and/or oxidation layers or products are then removed. Optionally, cracks in the component 120, 130 are also repaired. The component 120, 130 is then recoated and the component 120, 130 is used again.

The blade 120, 130 may be designed to be a hollow or solid. If the blade 120, 130 is intended to be cooled, it will be hollow and optionally also comprise film cooling holes 418 (indicated by dashes).

Figure 4:
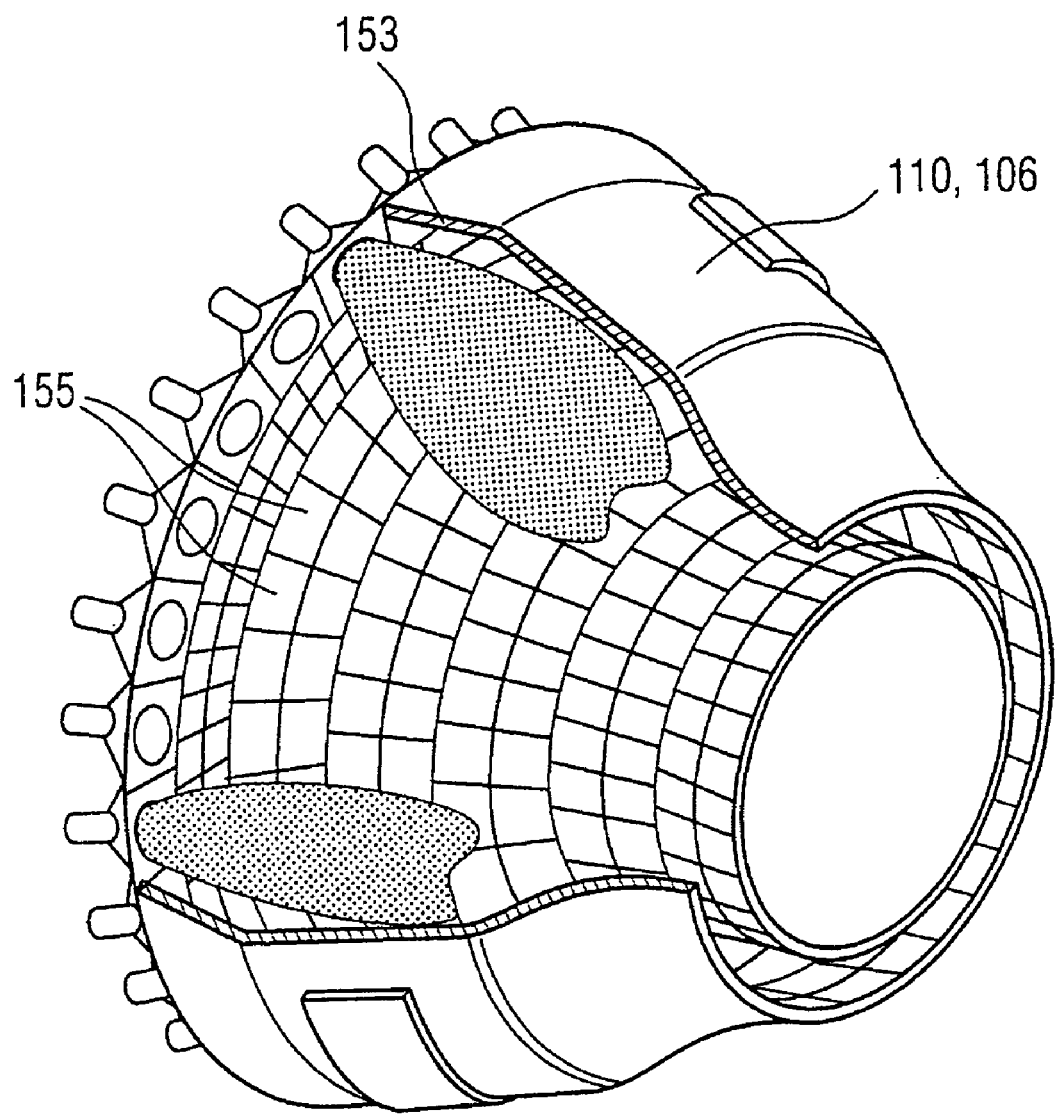
FIG. 4 shows a perspective view of a combustion chamber.
Figure 5:
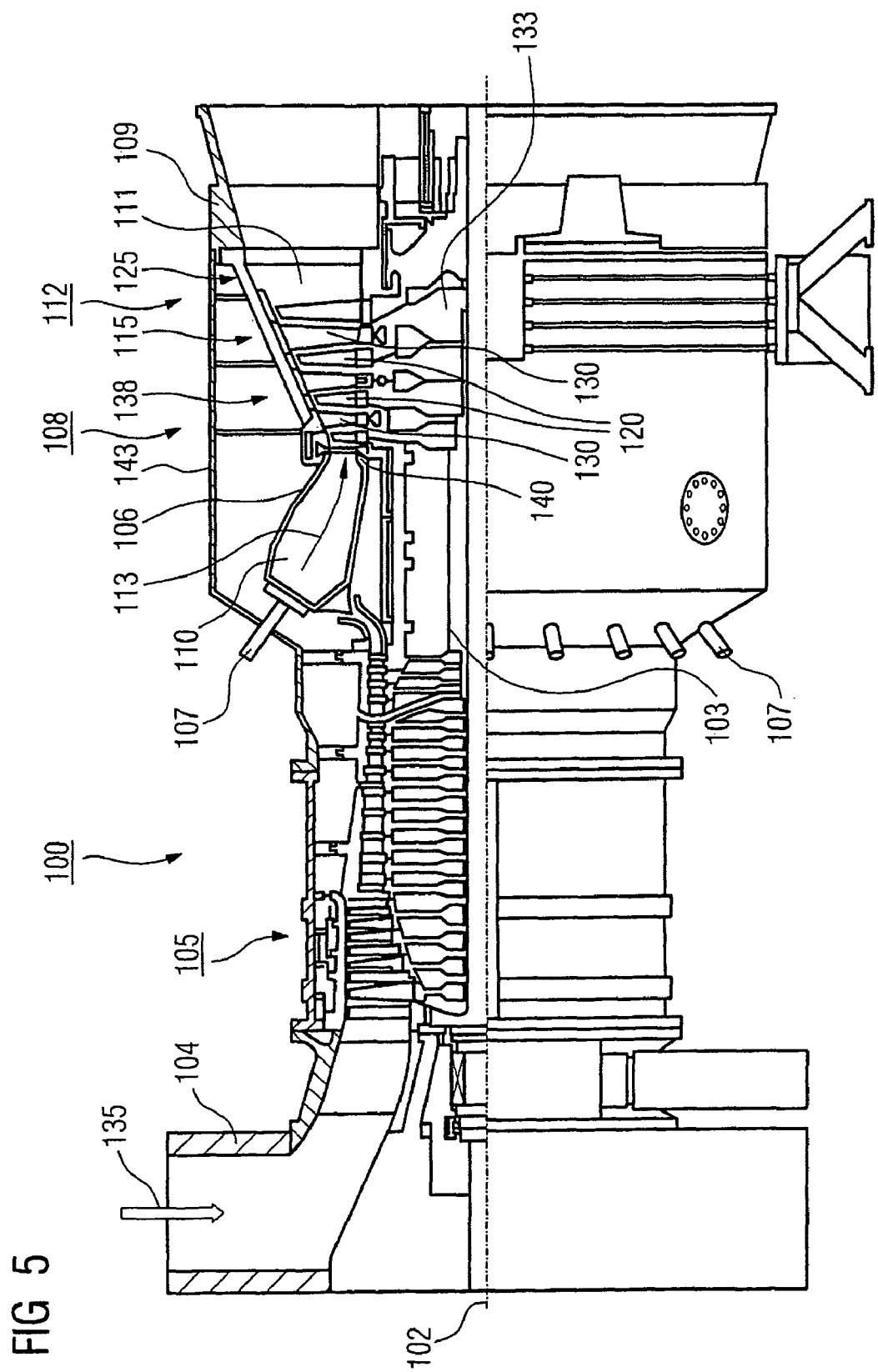
FIG. 5 shows a gas turbine.

FIG. 4 shows a combustion chamber 110 of a gas turbine 100 (FIG. 5). The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M. Each heat shield element 155 made of an alloy is equipped with a particularly heat-resistant protective layer (MCrAlX layer and/or ceramic coating) on the working medium side, or is made of refractory material (solid ceramic blocks). These protective layers may be similar to the turbine blades, i.e. for example MCrAlX means: M is at least one element from the group ion (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

Refurbishment means that heat shield elements 155 may need to have protective layers taken off (for example by sandblasting) after their use. The corrosion and/or oxidation layers or products are then removed. Optionally, cracks in the heat shield element 155 are also repaired. The heat shield elements 155 are then recoated and the heat shield elements 155 are used again.

Owing to the high temperatures inside the combustion chamber 110, a cooling system may also be provided for the heat shield elements 155 or for their retaining elements. The heat shield elements 155 are then hollow, for example, and optionally also have film cooling holes (not shown) opening into the combustion chamber space 154.

FIG. 5 shows a gas turbine 100 by way of example in a partial longitudinal section. The gas turbine 100 internally comprises a rotor 103, which will also be referred to as the turbine rotor, mounted so as to rotate about a rotation axis 102 and having a shaft 101. Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109. The ring combustion chamber 110 communicates with an e.g. annular hot gas channel 111. There, for example, four successively connected turbine stages 112 form the turbine 108. Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fastened on the rotor 103, for example by means of a turbine disk 133. Coupled to the rotor 103, there is a generator or a work engine (not shown).

During operation of the gas turbine 100, air 135 is taken in and compressed by the compressor 105 through the intake manifold 104. The compressed air provided at the turbine-side end of the compressor 105 is delivered to the burners 107 and mixed therewith a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are heated the most. In order to withstand the temperatures prevailing there, they may be cooled by means of a coolant. Substrates of the components may likewise comprise a directional structure, i.e. they are monocrystalline (SX structure) or comprise only longitudinally directed grains (DS structure). Iron-, nickel- or cobalt-based superalloys are for example used as material for the components, in particular for the turbine blades 120, 130 and components of the combustion chamber 110. Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The guide vanes 130 comprise a guide vane root (not shown here) facing the inner housing 138 of the turbine 108, and a guide vane head lying opposite the guide vane root. The guide vane head faces the rotor 103 and is fixed on a fastening ring 140 of the stator 143.

The invention claimed is:

1. A layer system, comprising:
   a substrate;
   an inner ceramic layer; and
   an outer ceramic layer on the inner ceramic layer,
   wherein the outer ceramic layer has at least 92 wt % of a pyrochlore phase,
   wherein the outer ceramic layer has at most 40% of a total layer thickness of the inner layer plus the outer layer, and
   wherein the outer ceramic layer consists of pyrochlore phases and secondary oxides, without sintering aids.

2. A layer system, comprising:
   a substrate;
   an inner ceramic layer; and
   an outer ceramic layer on the inner ceramic layer,
   wherein the outer ceramic layer has at least 92 wt % of a pyrochlore phase,
   wherein the outer ceramic layer has at most 40% of a total layer thickness of the inner layer plus the outer layer, and
   wherein the outer ceramic layer consists of pyrochlore phases and secondary oxides and sintering aids.

3. A layer system, comprising:
   a substrate;
   an inner ceramic layer; and
   an outer ceramic layer on the inner ceramic layer,
   wherein the outer ceramic layer has at least 92 wt % of a pyrochlore phase,
   wherein the outer ceramic layer has at most 40% of a total layer thickness of the inner layer plus the outer layer, and
   wherein the outer layer further comprises a secondary oxide with a proportion of 0.5 wt % to 8 wt %.

4. The layer system as claimed in claim 3, wherein the pyrochlore phase is selected from the group consisting of gadolinium zirconate, gadolinium hafnate, and a combination thereof.

5. The layer system as claimed in claim 4, wherein the gadolinium zirconate is $Gd_2Zr_2O_7$, and wherein the gadolinium hafnate is $Gd_2Hf_2O_7$.

6. The layer system as claimed in claim 3, wherein the secondary oxide has a proportion of 0.5 wt % to 7 wt %.

7. The layer system as claimed in claim 3, wherein hafnium oxides is the secondary oxide.

8. The layer system as claimed in claim 3, wherein zirconium oxide is the secondary oxide.

9. The layer system as claimed in claim 3, wherein the inner layer has a layer thickness of between 60% and 90% of the total layer thickness of the inner layer plus the outer layer.

10. The layer system as claimed in claim 3, wherein the total layer thickness of the inner layer plus the outer layer is at least 300 μm.

11. The layer system as claimed in claim 3, wherein the outer ceramic layer further comprises:
    a sintering aid, wherein the sintering aid is selected from the group consisting of:
    up to 0.05 wt % of silicon oxide,
    up to 0.1 wt % of calcium oxide,
    up to 0.1 wt % of magnesium oxide,
    up to 0.1 wt % of iron oxide,
    up to 0.1 wt % of aluminum oxide,
    up to 0.08 wt % of titanium oxide, and
    a combination thereof.

12. The layer system as claimed in claim 3, wherein the inner ceramic layer is on the metallic bonding layer or on the substrate, wherein the metallic bonding layer has an NiCoCrAlX alloy.

13. The layer system as claimed in claim 3, further comprising a metallic bonding layer, wherein the inner ceramic layers is on the metallic bonding layer.

14. The layer system as claimed in claim 13, wherein the metallic bonding layer has
    11 wt %-13 wt % cobalt,
    20 wt %-22 wt % chromium,
    10.5 wt %-11.5 wt % aluminum,
    0.3 wt %-0.5 wt % yttrium,
    1.5 wt %-2.5 wt % rhenium, and
    nickel.

15. The layer system as claimed in claim 13, wherein the metallic bonding layer has
    24 wt %-26 wt % cobalt,
    16 wt %-18 wt % chromium,
    9.5 wt %-11 wt % aluminum,
    0.3 wt %-0.5 wt % yttrium,
    1 wt %-1.8 wt % rhenium and
    nickel.

16. The layer system as claimed in claim 3, wherein the inner ceramic layer is a stabilized zirconium oxide layer.

17. The layer system as claimed in claim 16, wherein the stabilized zirconium oxide layer is an yttrium-stabilized zirconium oxide layer.

18. The layer system as claimed in claim 17, wherein the yttrium-stabilized zirconium oxide layer comprises 6 wt %-8 wt % of yttrium.

* * * * *